Jan. 15, 1946.     D. W. SMITH     2,393,124
CAGING MECHANISM FOR GYROS
Filed Oct. 26, 1942     2 Sheets-Sheet 1

INVENTOR
D. W. Smith
BY
ATTORNEY.

Jan. 15, 1946.    D. W. SMITH    2,393,124
CAGING MECHANISM FOR GYROS
Filed Oct. 26, 1942    2 Sheets-Sheet 2
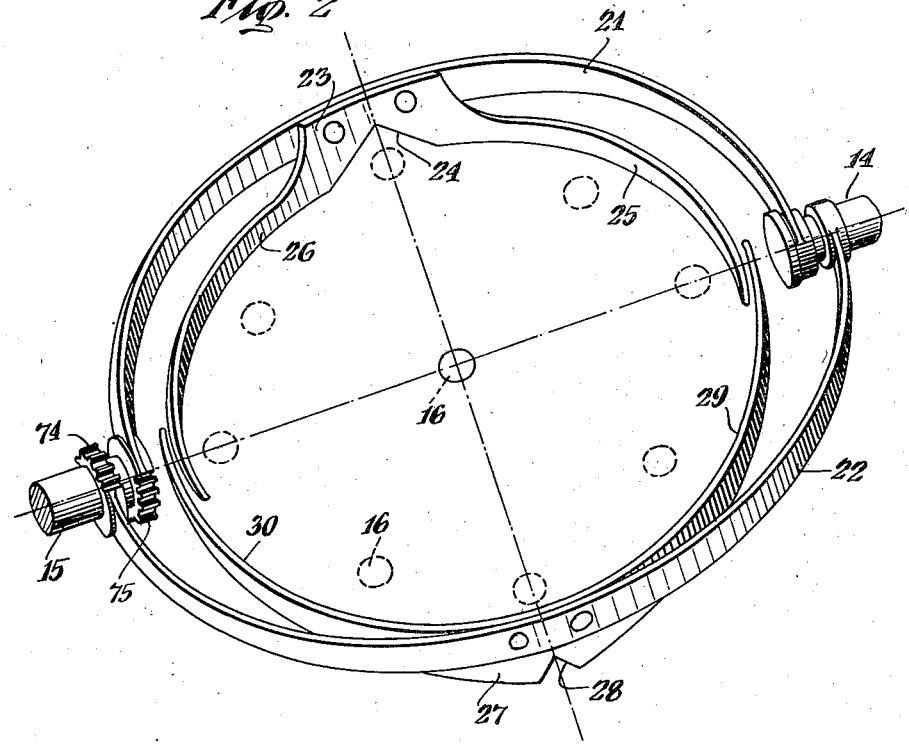
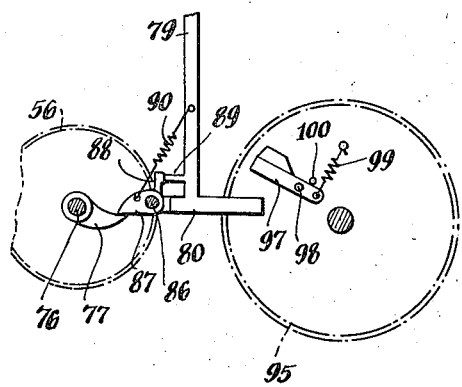
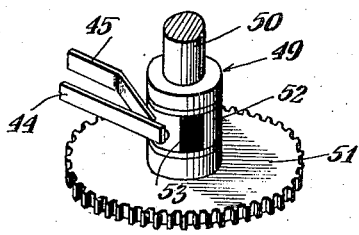
INVENTOR.
D. W. Smith
BY
ATTORNEY Patented Jan. 15, 1946

2,393,124

UNITED STATES PATENT OFFICE 2,393,124

CAGING MECHANISM FOR GYROS

Donald W. Smith, Bergenfield, N. J., assignor to Bendix Aviation Corporation, Bendix, N. J., a corporation of Delaware Application October 26, 1942, Serial No. 463,392

16 Claims. (Cl. 74—5)

This invention relates to gyroscopic devices, such as, artificial horizons or gyro verticals, for example, and more particularly to novel apparatus for automatically and/or manually caging and centralizing such devices.

It is well known to those skilled in the art that gyroscopic devices, of the foregoing character used upon aircraft, are subject to severe damage during violent craft maneuvers unless some provision is made for locking the gyroscope when such maneuvers are initiated. Also, where an automatic pilot is relied upon for directing craft flight, it is desirable, during the existence of abnormal flight conditions, to centralize and lock the gyroscope of the automatic pilot. Various devices have been provided, heretofore, for caging and locking gyroscopes and though they are generally suitable for the purpose intended they possess certain inherent and undesirable limitations which are overcome by the present invention.

A further source of damage, which must be considered, is that due to the occurrence of a power failure at the supply source provided for driving the gyroscope. Whether the gyroscope be electrically or pneumatically driven, it will lose rotational speed when a power failure occurs at its supply source and consequently precess abnormally creating undue and severe strains upon the bearings, etc. It is, therefore, highly desirable that, upon the occurrence of a power failure at the driving source, the gyroscope be immediately caged and centralized to prevent it from precessing and injuring its bearings.

An object of the present invention, therefore, is to provide novel caging means for gyroscopes which automatically cage and centralize the gyroscope upon the occurrence of certain given and predetermined conditions.

Another object of the invention is to provide novel caging means for gyroscopes which operate automatically and rapidly to cage and centralize the gyroscope when the craft upon which the gyroscope is mounted exceeds a predetermined angle of craft bank or pitch.

A further object of the invention is to provide novel caging apparatus for gyroscopes which operates automatically to cage the gyroscope in case of a power failure.

Another object of the invention is to provide a novel caging and locking mechanism for pneumatically or electrically driven gyroscopes which operates automatically to cage and centralize the gyroscope in case of a power failure either at the pressure source or the electrical source provided for driving the gyroscope.

A further object of the invention is to provide a novel artificial horizon or gyro vertical having caging means therefor which operate automatically either during a power failure or during violent craft maneuvers.

Another object is to provide novel apparatus for automatically caging a gyroscope, such as an artificial horizon, upon the occurrence of predetermined conditions and adapted to be remotely manually operated to uncage the gyroscope when the predetermined conditions have ceased to exist.

A further object of the invention is to provide novel gyro caging means which may be controlled remotely at will and by a simple manual operation.

A still further object of the invention is to provide novel and automatic caging means for gyroscopes which will cage the gyro automatically upon the existence of certain predetermined conditions without interfering with the manual caging control.

Another object is to provide a novel caging and locking apparatus for gyroscopic devices which is operable at all times to cage and lock the gyroscope whether it be spinning or not.

The above and further objects and novel features of the invention will appear more fully from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts throughout the several views, Figure 1 is an exploded perspective view, partially schematic and partially in section, of one form of a gyroscopic device embodying the subject matter of the present invention;

Figure 2 is a schematic view illustrating a detail of the structure of Figure 1;

Figure 3 is a perspective view illustrating the circuit bridging element of the structure of Figure 1; and, Figure 4 is a schematic view illustrating a further detail of the structure of Figure 1.

Figure 1:
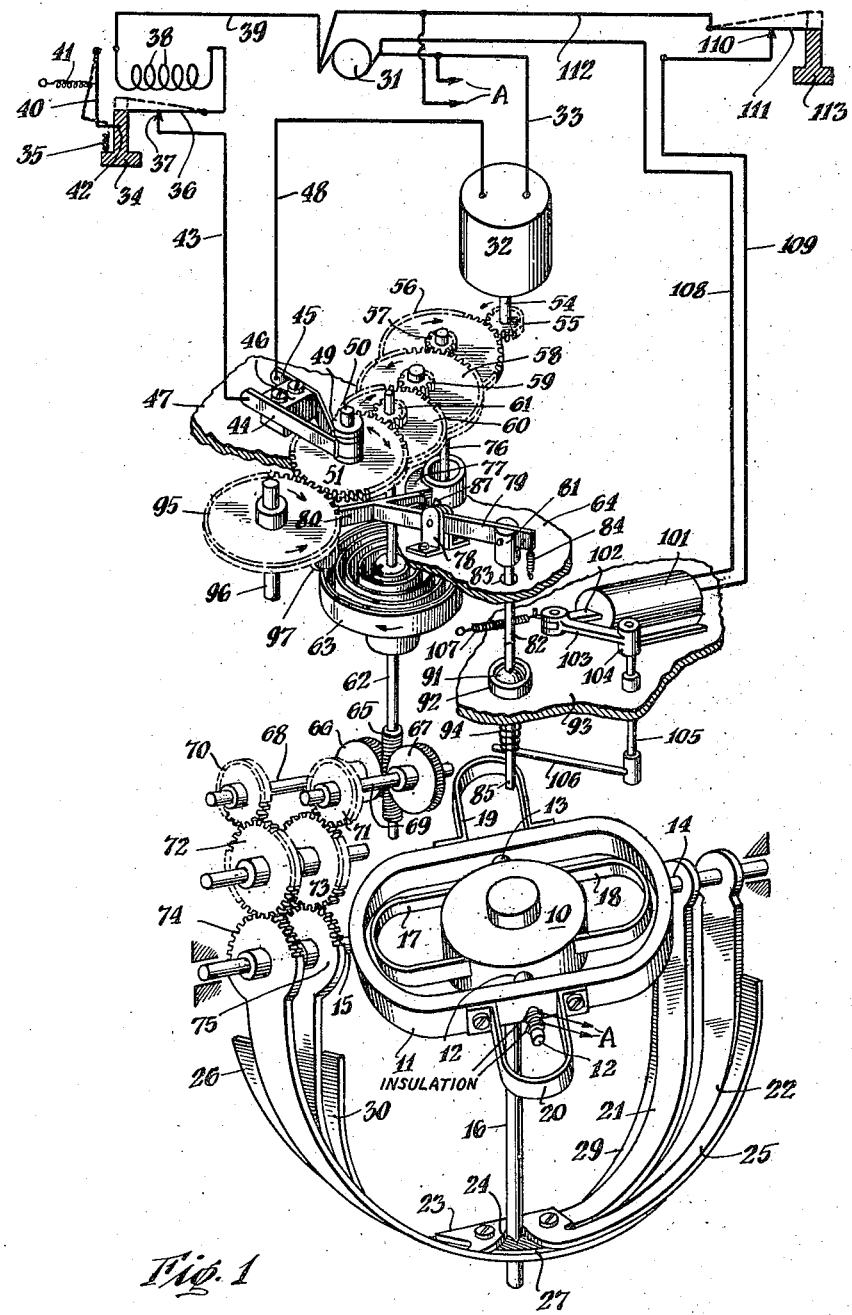

The novel apparatus of the present invention is illustrated in Figure 1 as applied to an artificial horizon gyro having a rotor (not shown), which may be driven either pneumatically or electrically, mounted within a casing 10 for spinning about a normally vertical axis. The rotor casing is mounted for oscillation about a horizontal axis within a gimbal mounting ring 11 by way of suitable trunnions 12 and 13 fastened to the rotor casing. The gimbal, in turn, is mounted for oscillation about a second horizontal axis by way of outer trunnions 14 and 15 which rotatably support the gimbal and rotor casing within a fixed support such as a suitable instrument housing (not shown) which is usually rigidly fastened to the craft instrument panel.

The gyro rotor is thus provided with three degrees of freedom and the instrument, when mounted on a craft, has its outer trunnions 14 and 15 arranged parallel to the longitudinal craft axis and inner trunnions 12 and 13 parallel with the craft's transverse axis. The rotor spin axis is maintained vertical by any of well known erection means, such as, for example, that shown in the United States patent to Robert Alkan, 2,159,118 issued May 23, 1939.

For carrying out the objects of the present invention, rotor casing 10 is provided with a caging pin 16 secured to the bottom of the casing, the pin projecting downwardly with its longitudinal axis arranged to be at all times coaxial with the rotor spin axis. Diametrically opposite loops 17 and 18 are suitably fastened to the rotor casing 10 at right angles to the inner trunnions 12 and 13 and other loops 19 and 20 are fastened to gimbal ring 11 at right angles to outer trunnions 14 and 15 for a purpose to presently appear.

A suitable gyro cage is now provided which comprises a pair of caging bails 21 and 22 loosely mounted upon outer trunnions 14 and 15 between the gimbal ring and the fixed support, generally represented by the supporting bearing surfaces of Figure 1. In actual construction, bails 21 and 22 are mounted upon sleeves 21a and 22a, respectively (only one set of these sleeves being shown), which are journalled within the instrument housing. The sleeves, in turn, carry bearings (not shown) for mounting therein trunnions 14 and 15 in such a manner that undesirable precessing torques are prevented from being generated upon the gyro during relative movement of the bails and trunnions 14 and 15.

Bail 21 is provided at its central base portion with a bracket 23 having a notched portion 24 and projecting outwardly from the bracket are two curved arms 25 and 26. Bail 22, like bail 21, is also provided with a bracket 27 which has a notched portion 28 facing and corresponding to notched portion 24 of bracket 23. Bail 22, furthermore, is provided with two curved arms 29 and 30 formed integrally with or secured to bracket 27 in the same manner that arms 25 and 26 are secured to bracket 23. The free ends of arms 25, 26 and 29, 30 are curved slightly toward caging pin 16 so that in an uncaged position (see Figure 2) the four arms together define substantially a circular stop which is adapted to engage the caging pin anywhere throughout 360° either when the gyro rotor is at rest with its spin axis in some position other than the normally vertical position or when the gyro has precessed abnormally. The dotted line positions of pin 16, indicated in Figure 2, show some of the possible positions of the pin prior to caging. The four curved arms are provided for the reason that without them, at any relatively large deviation of the rotor spin axis, the bails alone would be moved to a caged position without intercepting the rotor pin, and hence, would fail to centralize the gyro rotor.

In the position illustrated in Figure 1, bails 21 and 22 are shown to have been actuated by the novel apparatus of the present invention, to be described more fully hereinafter, into their operative or caged position wherein pin 16 has been engaged by one of the four arms and brought to a central and locked position within the two notched portions 24 and 28 of brackets 23 and 27. In their uncaged or inoperative position the bails are swung into a substantially horizontal plane, that is, bail 22 is swung forwardly 90° about the outer trunnions while bail 21 is swung rearwardly 90° about the same trunnions (see Figure 2). It is apparent, therefore, that as the bails are swung into an operative position, the free ends of arms 25, 26 will initially overlap the free ends of arms 29, 30, guiding the rotor pin therebetween until the pin falls into both of the notched portions 24 and 28 of the brackets at which points arms 25, 26 have completely overlapped arms 29 and 30.

The novel apparatus of the present invention for actuating the gyro cage, comprising bails 21 and 22, consists of a power circuit including a motor for winding a caging spring, the spring being held in a loaded or wound condition until the occurrence of a given predetermined condition when the spring is released to unwind and its force is expanded through a suitable gear train to drive the caging bails and their respective arms from the inoperative position of Figure 2 to the operative position of Figure 1.

The power circuit comprises a suitable energy source 31 which, in the case of an electrically driven gyro, supplies current to the gyroscope through suitable leads A and brushes, shown schematically in Figure 1, in a well known manner. One side of source 31 connects by way of a lead 33 to one side of a motor 32 and with the other side of the motor by way of a remote manual uncaging control. The manual uncaging control comprises a slidably mounted knob 34 which is normally held by way of a spring 35 in a circuit caging position, illustrated by the dotted line position of Figure 1. Knob 34 has fastened thereto but insulated therefrom a pivoted contact bar 36, the latter being adapted, when the knob is pulled outwardly to the full line or uncaging position of Figure 1, to engage a stationary contact 37. Contact bar 36 connects electrically with a coil or solenoid 38 which, by way of a lead 39, is connected to the other side of source 31.

A latching device is provided for holding knob 34 in the uncaged or outward position and comprises a pivoted lever 40 inductively coupled with solenoid 38 and normally urged by a spring 41 to the dotted line or unlatched position of Figure 1. Upon energization of the solenoid, such as, when the knob is pulled downwardly to bring contact bar 36 into engagement with contact 37, lever 40 is swung to the right to engage a slot 42 formed in the knob to hold the latter in the uncaged position.

A suitable lead 43 connects stationary contact 37 with a contact element 44 which, together with a second contact element 45, is mounted by means of an insulating block 46 upon a plate 47. Contact element 45, furthermore, connects with the other side of motor 32 by way of a lead 48.

Contact elements 44 and 45 engage a circuit bridging element 49 which is secured to a shaft 50 carrying a gear 51 thereon. The circuit bridging element, better shown in Figure 3, is provided with a conducting segment 52 throughout approximately 345° thereof while the remaining portion is composed of a non-conducting surface 53.

Bridging element 49 is rotated with shaft 50 by gear 51 which, in turn, is driven by motor 32 through a speed reduction gearing. To this end motor 32 is provided with a driving shaft 54 having a pinion 55 secured thereto. The speed reduction gearing comprises a gear 56 meshing with and driven by pinion 55 and provided with a pinion 57 which drives a second gear 58. A pinion 59 is secured for rotation with gear 58 and meshes with and drives a third gear 60 having a pinion 61 for driving gear 51. The speed reduction gearing is so designed that the bridging element is always driven an angular amount less than one complete revolution for a purpose to presently appear.

Gear 60 and pinion 61 are secured to a shaft 62 which is rotated during rotation of gear 60 by motor 32. A caging spring element 63 is sleeved about shaft 62 and is secured to the shaft at its inner end and anchored at its outer end to the bottom of a plate 64 arranged parallel to and spaced apart from plate 47. The driving force of spring 63 is transmitted to bails 21 and 22 by means of a helical gear 65 secured to shaft 62 which is under the influence of the spring. Helical gear 65 meshes with and drives two helical gears 66 and 67 which are mounted upon parallel shafts 68 and 69, the free ends of which carry gears 70 and 71 thereon. Gears 70 and 71 drive gears 72 and 73 which cooperate with toothed sectors 74 and 75 formed with the bails to move the latter when the spring is winding or unwinding.

It will be shown hereinafter that subsequent to a caging operation, with spring 63 unwound and bails 21 and 22 in the position of Figure 1, contact elements 44 and 45 will be in engagement with conducting segment 52 of the circuit bridging element 49. To energize the power circuit, therefore, knob 42 is pulled outwardly to engage contact bar 36 with contact 37 whereby motor 32 is connected across source 31 and drives the speed reduction gearing until non-conducting surface 53 of the bridging element engages contact element 45 to break the circuit and deenergize the motor. During actuation of the speed reduction gearing, shaft 62 has been rotated to wind spring 63 to place it in condition for a subsequent caging operation.

Means are provided to lock the spring in its wound position to prevent it from unwinding and moving bails 21 and 22 downwardly until certain desired and predetermined conditions exist. To this end a shaft 76, which carries thereon gear 56 and pinion 57 of the speed reduction gearing, is provided with a pawl element 77, as better shown in Figure 4. Mounted on plate 64 is a bracket 78 which pivotally supports therein a lever 79 having a transverse arm 80 secured thereto or formed integrally therewith for cooperation with pawl 77.

The free end of lever 79 is secured within a bifurcated collar 81, the latter being carried by a rod 82 which projects below plate 64 by virtue of an aperture 83 provided in the plate for that purpose. A spring element 84 connects lever 79 adjacent collar 81 to plate 64 and tends to maintain arm 80 above pawl 77 to permit spring 63 to unwind. Normally, however, spring 84 is not permitted to swing arm 80 to the unlocked position because the bottom of rod 82 is engaged and limited against downward movement by a trigger 85. In being so limited, rod 82 holds lever 79 in such a manner that one end of transverse arm 80 rests in the path of pawl 77.

The part of arm 80 immediately adjacent pawl 77 is provided with a recessed portion having pivotally mounted thereon, by way of a pin 86, a stop member 87 (see Figure 4). Member 87 is provided with an abutment 88 adapted to cooperate with a second abutment 89 carried by lever 79 while a spring 90, anchored to the lever and the stop member, normally urges abutments 88 and 89 to engage. By this construction pawl 77 together with shaft 76 may rotate in a clockwise direction without interference from stop 87, the latter being pivoted out of the way against the action of spring 90 by pawl 77, but upon a reverse rotation stop 87, because of the engagement of abutment 88 with abutment 89, engages and holds pawl 77 and shaft 76 against rotation, thereby defining a lock for spring 63 to prevent its unwinding.

Trigger 85, provided for normally holding rod 82 in position to maintain arm 80 and, therefore, stop member 87, in engagement with pawl 77, has formed therewith a ball swivel 91 which mounts the trigger for universal movement within a socket 92 formed in a third plate 93, the latter being arranged below and parallel to plates 47 and 64. Furthermore, trigger 85 is centrally arranged so that normally its longitudinal axis is coaxial with the normally vertical gyro spin axis. A resilient spring 94 arranged about trigger 85 is secured at one end to plate 93 and at its other end to the trigger so that when the trigger is unrestrained it will always be brought to its normally vertical position in the path of rod 82.

Under certain conditions trigger 85 is mechanically unseated to permit spring 84 to swing lever 79 and rod 82 into an extreme downward position wherein arm 80, together with stop member 87, is lifted away from pawl 77 to release spring 63 to cage the gyro in a manner to presently appear. When, subsequent to a caging operation, motor 32 is energized to wind spring 63 to uncage the gyro, such action, of itself, will not operate rod 82 and lever 79 to position arm 80 and stop 87 to engage pawl 77 and hold the spring in its wound condition. For this reason a gear 95, mounted upon a shaft 96, is provided which meshes with gear 51 to be driven with the latter by the motor through the speed reduction gearing.

As better shown in Figure 4, a cam 97 is pivotally mounted on the bottom of gear 95 by way of a pin 98 while a spring 99, anchored at one end to the gear is fastened at its other end to the free end of cam 97. A second pin 100, carried by the gear adjacent to the cam, is arranged in such a manner that cam 97 may pivot about pin 98 in a clockwise direction against spring 99 but cannot pivot in a counterclockwise direction. With the spring 63 wound to its maximum capacity, gear 95 is rotated sufficiently to cause cam 97 to pass over arm 80 to urge the arm downwardly and, simultaneously therewith, rod 82 is lifted and trigger 85, by virtue of spring 94, is centralized to engage and hold rod 82. At this point, shaft 76 continues rotating and for each revolution pawl 77 trips member 87 until motor 32 is de-energized at which time shaft 76 is rotated in a reverse direction until pawl 77 engages and is held by stop member 87.

To the end that trigger 85 may be mechanically unseated, a suitable solenoid 101 is provided which is mounted upon plate 93 and is provided with a core or plunger 102 which pivotally supports at its free end a lever 103. Lever 103 is secured to a collar 104 mounted upon a shaft 105 rotatably journalled within plate 93 and provided at its lower extremity with a trip pin 106 adapted, when the solenoid is de-energized, to engage and trip trigger 85 from its normal position shown in Figure 1. A resilient spring 107, anchored at one end, connects with plunger 102 to urge it outwardly when the solenoid is de-energized.

Solenoid 101 connects with one side of source 31 through a suitable lead 108 and with the other side of the source through a lead 109, a stationary contact 110, a pivoted contact bar 111, and a lead 112. Contact bar 111 is shown in its normally closed position and its free end is connected to and insulated from a slidable control knob 113. In such position solenoid 101 always is energized so that plunger 102 is urged inwardly against the action of spring 107 to urge trip pin 106 away from trigger 85.

Plates 47, 64 and 93 are parallel to and spaced from each other and are fastened to a stationary part of the casing forming the bearings for supporting trunnions 14 and 15. The plates, furthermore, define bearing and supporting surfaces for the various elements of the apparatus above described and have been shown in section only for a better understanding of the present invention.

The novel caging and uncaging apparatus above described is adapted to operate in four distinct manners. It will act to cage the gyro automatically in case of a power failure or when the craft exceeds a predetermined angle of bank or pitch and it may be remotely controlled by a manual operation to cage as well as uncage the gyro. Each method of operation will be described hereinbelow.

*Operation #1*

For purposes of clarity, it may be considered that the gyro is in a caged position and that knob 34 is pulled outwardly to the full line position of Figure 1 to uncage the gyro. Contact bar 36 is brought into engagement with stationary contact 37 whereby motor 32 is energized and winds spring 63 through the speed reduction gearing system, raising bails 21 and 22 to the position of Figure 2, until non-conductor portion 53 of circuit bridging element 49 engages with contact element 45 to break the circuit and de-energize the motor. At the same time, solenoid 38 is de-energized so that spring 41 swings lever 40 to the left or dotted line position of Figure 1 and spring 35 snaps knob 34 inwardly to disengage contact bar 36 from stationary contact 37. Just previous to the time that the non-conductor portion 53 of the circuit bridging element comes into engagement with contact element 45 to break the circuit, cam 97 engages arm 80 to urge stop 87 into the path of pawl 77. Simultaneously therewith, spring 94 centers trigger 85 to reset and hold rod 82. As non-conductor portion 53 of element 49 engages contact element 45, the motor is de-energized and pawl 77 is rotated in a reverse direction to engage and be held by stop member 87, in which position spring 63 is locked against unwinding. Thus, the complete mechanism is in condition for an automatic caging operation upon the occurrence of predetermined conditions.

With the gyro rotor driven either pneumatically or electrically, it now may be assumed that the craft, and thus, the gyro supporting structure has been subjected to a predetermined angle of bank or pitch. With a predetermined angle of craft bank, depending upon the direction thereof, either loop 19 or 20 of gimbal ring 11 will engage and trip trigger 85. Should, on the other hand, the craft be subjected to a predetermined angle of pitch, depending upon whether it be climb or dive, either loop 17 or 18 of rotor casing 10 will engage and trip the trigger.

Whichever loop engages and trips trigger 85, rod 82 is released and urged downwardly by spring 84 thereby pivoting lever 79 to swing arm 80 and stop member 87 from the path of pawl 77 so that spring 63 is free to unwind and rotate shaft 62. Bails 21 and 22, therefore, are lowered to engage and centralize caging pin 16 to cage the gyro by virtue of the driving connection between helical gear 65 and bail sectors 74, 75 through gears 70, 71; 72, 73 and helical gears 66, 67. In addition to driving bails 21 and 22 to their caged position, expanding spring 63 will also cause reversed rotation of the gear train so that non-conductor portion 53 will be rotated clockwise to almost engage contact element 44, leaving both contact elements 44 and 45 in engagement with the conducting portion 52 of bridging element 49.

*Operation #2*

The second operation consists in remotely uncaging the gyro when the undesirable flight condition has ceased to exist. To this end, knob 34 is pulled downwardly to bring contact bar 36 into engagement with stationary contact 37 so that motor 32 is energized to drive the speed reduction gearing. Solenoid 38, being energized, swings lever 40 to the right to engage slot 42 and lock knob 34 in its uncaging position.

Shaft 62 is rotated through the speed reduction system to wind spring 63. Cam 97 is moved with gear 95 until it passes over arm 80 and since gear 95 is rotating clockwise (Figure 4) stop pin 100 prevents arm 80 from swinging cam 97 out of the way about its pivot 98. Hence, cam 97 urges arm 80 together with stop 87 into the path of pawl 77. At this moment spring 94 centers trigger 85 to engage and reset rod 82. As the spring is being wound, pawl 77 travels in a clockwise direction with shaft 76 and engages and pivots stop member 87 about its pivot 86 once for every revolution of shaft 76.

With continued rotation of motor 32, non-conductor portion 53 engages contact element 45 to open the circuit and de-energize the motor. With motor de-energization, solenoid 38 is de-energized and lever 40 is swung to the left by virtue of spring 41. At the moment motor 32 is de-energized, spring 63, being in its maximum wound condition, starts to rotate shaft 62 in an opposite direction until pawl 77 engages stop 87. The latter cannot pivot away from pawl 77 because abutments 88, 89 engage so that the spring is locked and the complete apparatus is in condition for a subsequent caging operation.

*Operation #3*

In the event of a power failure at source 31, when the gyroscope is connected electrically thereto and driven thereby, it is desirable to cage the gyro so that undue gyro precession and consequent bearing damage will be prevented. Also, should some part fail to operate in the manner intended within the caging circuit it may be desired to cage the gyro until such part can be repaired. The third operation, about to be described, is concerned with automatically caging the gyro upon the occurrence of a power failure either at the source or within the circuit.

Under normal operating conditions, knob 113 of the caging circuit is in its full line closed position of Figure 1 so that solenoid 101 is energized by virtue of its connection across source 31 to hold plunger 102 inwardly and trip in 106 away from trigger 85.

With the gyro connected to supply source 31, any failure at the source to supply current to the gyro causes a like failure in the caging circuit so that solenoid 101 is de-energized whereupon plunger 102, under the influence of spring 107, swings trip pin 106 to displace and unseat trigger 85 against the action of spring 94.

Rod 82, no longer held in place by trigger 85, is urged downwardly by spring 84 to raise arm 80 and stop member 87 away from the path of pawl 77. Spring 63 is free to unwind and rotate shaft 62 which, through bail sectors 74, 75 swings bails 21 and 22 to engage and center pin 16 to cage the gyro. As the gyro is caged, the speed reduction gearing brings non-conducting portion 53 of bridging element 49 almost into engagement with contact element 44.

The whole apparatus is now in the caged condition as that described in connection with Operation No. 1. Once the power failure has been remedied, knob 34 is pulled downwardly to close the circuit to the motor to thereby wind spring 63 and lift bails 21 and 22 to uncage the gyro in the same manner as that described in connection with Operation No. 2.

The automatic caging operation because of a power failure is somewhat different from the above in the case of a pneumatically driven gyroscope. With a power failure in either a pressure or suction pump used for pneumatically driven gyroscopes, the gyro on losing speed will precess in such a manner that the loops of one of sets 17, 18 or 19, 20 will engage and trip trigger 85. Release of rod 82 initiates the caging operation in the same manner as that described in connection with Operation No. 1 or when the solenoid 101 has been de-energized as described in connection with Operation No. 3.

*Operation #4*

Where neither abnormal flying conditions nor power failure occurs, it may, nevertheless, be desired to manually cage the gyro. The apparatus thus far described is adapted to cage the gyro automatically but not by remote manual control.

Knob 113 is provided for this purpose and when it is desired to remotely cage the gyro by manual control, the knob is pushed inwardly to the dotted line position of Figure 1 wherein contact bar 111 is disengaged from stationary contact 110 to break the circuit to solenoid 101. The solenoid is thus de-energized so that plunger 102 is swung outwardly by spring 107 to cause trip pin 106 to engage and trip trigger 85. The subsequent operation of the apparatus to unlock spring 63, permitting it to unwind, and lower bails 21 and 22 to cage the gyro is the same as that described in connection with Operation No. 1 and Operation No. 3.

It will now be apparent to those skilled in the art that a novel and desirable caging mechanism has been provided which acts to cage the gyro automatically during either abnormal flying conditions or during a power failure. The novel mechanism, furthermore, may be actuated by means of a remote manual control and after either of the automatic caging operations or the manual caging operation, the gyro may be uncaged by a remote manual control.

Although only a single embodiment of the present invention has been illustrated and described in detail, it is to be expressly understood that the invention is not limited thereto. Various changes can be made in the design and arrangement of the parts without departing from the spirit and scope of the invention as will now be understood by those skilled in the art. For a definition of the limits of the invention, reference will be had primarily to the appended claims.

I claim:

1. In combination with a gyro-vertical having a rotor provided with a casing and an outer support mounting said casing for freedom about two mutually perpendicular axes, an automatically operated cage for centering said casing with respect to the support, a resilient controller for said cage, means comprising a device for mechanically locking said controller against operation, and means actuated by a predetermined relative tilt of said casing and said support for releasing said locking device.

2. In combination with a gyro-vertical having a rotor provided with a rotor casing and an outer support mounting said casing for freedom about two mutually perpendicular axes, an automatically operated cage for centralizing said casing with respect to the support, a controlling member for said cage, mechanical locking means normally holding said member in an inoperative condition, and means actuated by a predetermined relative tilt of said casing and said support for engaging and operating said locking means to release said controlling member.

3. In combination with an artificial horizon having a rotor provided with a casing and an outer support mounting said casing for freedom about two mutually perpendicular axes, a cage for centralizing and locking said casing about said two axes, a controller for said cage, locking means for normally restraining operation of said controller, and means comprising a control circuit for engaging and releasing said locking means.

4. In combination with an artificial horizon having a rotor provided with a casing and an outer support mounting said casing for freedom about two mutually perpendicular axes, a cage for centralizing and locking said casing about said two axes, a normally wound resilient member for operating said cage, locking means normally restraining said member from unwinding, and manually operative means comprising a control circuit and a solenoid therein for mechanically disengaging said locking means whereby said member unwinds to operate said cage.

5. Automatic caging means for a gyroscope having a rotor provided with a normally vertical spin axis and a rotor casing mounted for freedom about two mutually perpendicular axes other than said spin axis, comprising a cage for centralizing and locking said casing about said two axes upon the occurrence of a predetermined condition, a normally wound resilient member for operating said cage, locking means normally holding said resilient member against unwinding, means operated by the occurrence of said condition for engaging and releasing said locking means whereby said cage is operated, and control means for winding said resilient member and operating said cage to an uncaging position.

6. Caging mechanism for a gyroscope having a rotor provided with a normally vertical spin axis and a rotor casing mounted for freedom about two mutually perpendicular axes other than said spin axis, comprising a cage for centralizing and locking said casing about said two axes, a normally wound resilient member for operating said cage, means normally holding said resilient member against unwinding, a control circuit including means for engaging and releasing said holding means whereby said cage is operated, and means connected to said circuit for winding said member and operating said cage to an uncaged position.

7. Caging mechanism for a gyroscope having a rotor provided with a normally vertical spin axis and a rotor casing mounted for freedom about two mutually perpendicular axes other than said spin axis, comprising a cage for centralizing and locking said casing about said two axes, a normally wound spring for operating said cage, means for holding said spring against unwinding, a control circuit including means for engaging and releasing said holding means whereby said spring unwinds to operate said cage, and means included in said circuit for winding said spring and operating said cage to an uncaged position.

8. In combination with an artificial horizon having an electrically driven rotor provided with a casing and an outer support mounting said casing for freedom about two mutually perpendicular axes, a cage for centralizing and locking said casing about said two axes, a wound spring for driving said cage, locking means normally holding said spring against unwinding, means comprising a control circuit for operating said cage to an uncaged position and for winding said spring, a current source included in said circuit and supplying current to said rotor, and means responding to a power failure at said source for engaging and releasing said locking means whereby said spring operates said cage to cage and lock said casing about said two axes.

9. In combination with a gyro vertical having an electrically driven rotor provided with a casing and an outer support mounting said casing for freedom about two mutually perpendicular axes, a cage for centering said casing with respect to the support, actuating means for said cage, means comprising a trigger for normally holding said actuating means in an inoperative condition, means brought into operation upon a predetermined relative tilt of said casing and said support for actuating said trigger to release said actuating means whereby said cage centers said casing, a control circuit including a motor for energizing said actuating means and operating said cage to an uncaged position whereupon said trigger holds said actuating means against operation, a current source included in said circuit and supplying current to said rotor, and means automatically responsive to a power failure in said circuit for actuating said trigger to release said actuating means whereby said cage centers said casing.

10. In combination with a gyro-vertical having an electrically driven rotor provided with a casing and an outer support mounting said casing for freedom about two mutually perpendicular axes, a cage for centering said casing with respect to the support, actuating means for said cage, means comprising a trigger for normally holding said actuating means in an inoperative condition, means brought into operation upon a predetermined relative tilt of said casing and said support for actuating said trigger to release said actuating means whereby said cage centers said casing, means comprising a control circuit for energizing said actuating means and operating said cage to an uncaged position whereupon said trigger holds said actuating means against operation, a current source included in said circuit and supplying current to said rotor, means including a solenoid operated trip member for said trigger connected in said circuit, and manually operative controlling means in said circuit for operating said trip member to actuate said trigger whereby said actuating means is released to operate said cage to center said casing.

11. In combination with a gyro-vertical having a rotor provided with a casing and an outer support mounting said casing for freedom about two mutually perpendicular axes, an automatically operated cage for centering said casing with respect to the support upon the occurrence of a predetermined condition, actuating means for said cage, means comprising a trigger for holding said actuating means in an inoperative condition, and means brought into operation in response to the occurrence of said condition for actuating said trigger to release said actuating means.

12. In combination with a gyro-vertical having a rotor provided with a casing and an outer support mounting said casing for freedom about two mutually perpendicular axes, an automatically operated cage for centering said casing with respect to the support upon the occurrence of a predetermined relative tilt of said casing and said support, actuating means for said cage, means comprising a normally resiliently centered trigger for holding said actuating means in an inoperative condition, and means brought into operation in response to the occurrence of said predetermined tilt for displacing said trigger to release said actuating means.

13. In combination with a gyro-vertical having a rotor provided with a casing and an outer support mounting said casing for freedom about two mutually perpendicular axes, a cage for centering said casing with respect to the support and normally maintained in an uncaged position, actuating means for said cage, means comprising a normally resiliently constrained trigger for holding said actuating means in an inoperative condition, and a control circuit including manually operative means therefor for displacing said trigger to release said actuating means.

14. In combination with a gyro-vertical having an electrically driven rotor provided with a casing and an outer support mounting said casing for freedom about two mutually perpendicular axes, a cage for centering said casing with respect to the support and normally maintained in an uncaged position, actuating means for said cage, means comprising a normally resiliently constrained trigger for holding said actuating means in an inoperative condition, and means automatically operative in response to a power failure at a current source supplying said rotor for displacing said trigger to release said actuating means.

15. In combination with a gyro vertical having a rotor provided with a rotor casing and an outer support mounting said casing for freedom about two mutually perpendicular axes, a cage for centralizing said casing with respect to the support, means comprising a rotatable driving member for driving said cage, a locking mechanism normally restraining operation of said driving means, and means actuated by a predetermined relative tilt of said casing and said support for engaging and releasing said locking mechanism.

16. In combination with a gyro vertical having a rotor provided with a rotor casing and an outer support mounting said casing for freedom about two mutually perpendicular axes, a cage for centralizing said casing with respect to the support, means comprising a rotatable driving member for driving said cage, a locking mechanism normally restraining operation of said driving means, means comprising a control circuit for operating said cage to an uncaged position, and means comprising a trip member responding to a power failure in said circuit for engaging and releasing said locking mechanism.

DONALD W. SMITH.